April 2, 1940.   P. R. PERKINS ET AL   2,195,936
METHOD FOR REPRODUCING STRIP PHOTOGRAPHS ON SHEETS
Filed Oct. 3, 1938

Inventors
Paul R. Perkins
Edwin Carter Perkins
By Alexander Dowell
Attorneys

Patented Apr. 2, 1940

2,195,936

UNITED STATES PATENT OFFICE 2,195,936

METHOD FOR REPRODUCING STRIP PHOTOGRAPHS ON SHEETS

Paul R. Perkins and Edwin Carter Perkins, Baltimore, Md.

Application October 3, 1938, Serial No. 233,066

3 Claims. (Cl. 95—75)

Our invention relates to photography, and one object thereof is to provide a method of printing pictures by one exposure, from negatives arranged in a series on a roll of uncut strip film, upon a rectangular sheet of sensitized photographic paper of minimum size, the pictures being arranged on the sheet in consecutive order and in parallel rows.

The present day candid cameras such as the Leica, Retina, Contax, Robot, Argus and similar types usually employ rolls of 35 m. m. film containing in series about thirty-six negative exposures to the roll. There are rolls of films in use containing a lesser number of exposures, but the same method may be used for printing on a correspondingly smaller size sheet of paper. By our method the thirty-six negatives of the usual strip of film can be printed in parallel rows upon a sheet of photographic paper of a convenient minimum size (about 8" x 10") without cutting the film apart. Furthermore, the negative exposures on the film roll are usually numbered consecutively, and by our method these numbers will also appear in connection with the pictures in the rows on the printed sheet; and thus the printed sheet produced by our method will provide a compact handy record of all the negatives on the corresponding uncut film for the purpose of indexing and classifying, so that if a party wishes to locate a particular negative on a given uncut roll of film he can readily do so by inspecting the sheet corresponding to such film, without having to first unroll the film, which operation tends to scratch the film each time handled, and without having to then inspect the negatives successively thereon. By our method the numbered pictures on the sheet of all numbered negatives contained in the uncut roll of film offers an excellent means for filing or indexing since the printed sheet may be marked with a file reference number, also the container for the uncut film roll, which container is usually a small can or round pasteboard box, may be marked with the same number, and thus reference to the reference number of the printed sheet and film, and reference to the number of a particular picture on said sheet, provides means for quickly ascertaining and locating a desired negative on the uncut film.

Our method of printing strip photos upon sheets is economical since all the exposures are printed simultaneously on one sheet by one operation; and said sheet will present a ready view of all exposures. Thus a party may quickly ascertain which pictures may warrant enlarging, and moreover as the same printing exposure is used for all negatives, the printed sheet will provide means to study one's photographic ability, since over-or-under exposures can be easily compared due to the fact that all prints on the sheet are arranged substantially side by side.

We will explain the invention with reference to the accompanying drawing, and will summarize in the claims the essential features thereof for which protection is desired.

Figure 1:
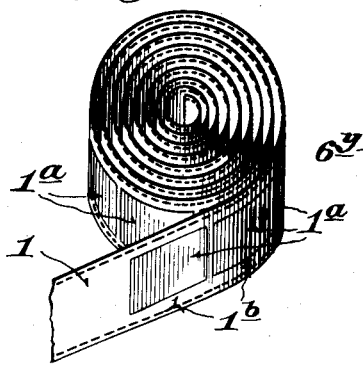
Fig. 1 is a perspective view of a partially unrolled strip of film, such as ordinarily used in most types of candid cameras, and showing the series of consecutively numbered negative exposures.

As shown in Fig. 1, the strip of film 1 is of the roll-type used in candid cameras, the same usually being 35 m. m. and carrying approximately thirty-six negative exposures 1a, each exposure being numbered consecutively as indicated at 1b. A 35 m. m. film containing thirty-six negatives we have found will print a sheet 2 (Fig. 2) of size approximately 8" x 10". Film 1 however may contain a greater or lesser number of exposures 1a without affecting the printing method, although use of same will permit use of a smaller or larger size rectangular sheet 2.

Figure 2:
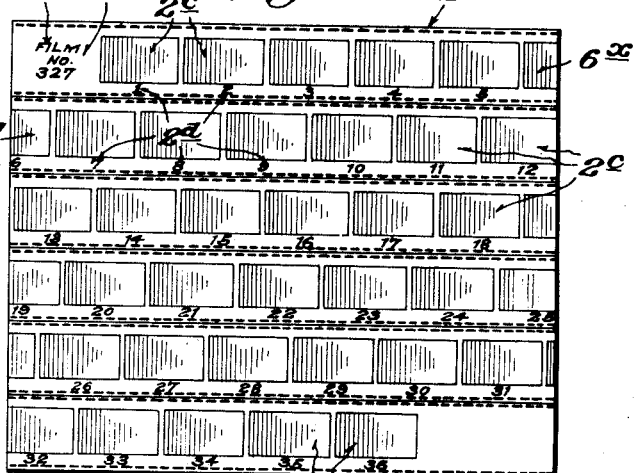
Fig. 2 is a plan view of a sensitized rectangular sheet containing, according to our method, prints of all the negatives on the film arranged in parallel rows, each print bearing the number corresponding with the number of the negative exposure on the film.
Figure 3:
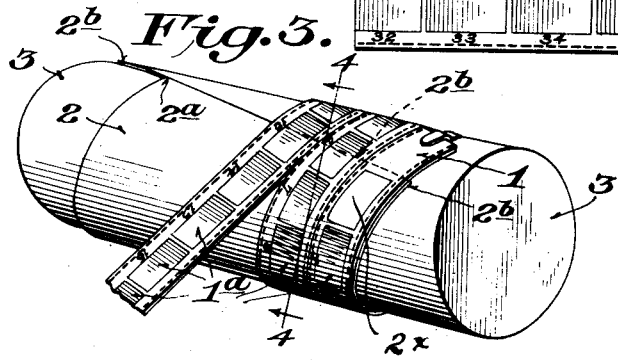
Fig. 3 is a diagrammatic view showing one method of printing by our method utilizing a cylinder with a light source external to the cylinder, and showing the positions of the sensitized sheet and strip of film on the cylinder.
Figure 4:
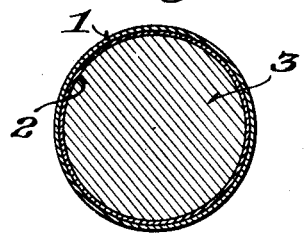
Fig. 4 is a transverse section on the line 4—4, Fig. 3.

According to the method illustrated in Figs. 3-4, wherein the light source (not shown) used for printing is applied externally of the cylinder 3, the rectangular sheet 2 of sensitized photographic paper, of length sufficient to make one complete turn about said cylinder 3, is secured around the cylinder in such manner that the ends of the sheet abut, but the corners 2a at one side of the line of abutment are offset from the corners 2b at the other side of the line of abutment a distance substantially equal to the width of film 1. Thus a 35 m. m. film containing thirty-six negative exposures, when using a cylinder of 10" circumference, would require a sheet 10" long and approximately 8" wide. After sheet 2 has been thus secured in any desired manner upon cylinder 3 with its sensitized face outermost, the strip of film 1 is then wrapped spirally around sheet 2 in closely adjacent convolutions from one end to the other end, the convolutions being parallel to the side edges of the sheet, and the film being disposed so that negative exposure "1" is adjacent one outwardly projecting offset corner of sheet 2, as arranged on the cylinder, but spaced approximately a distance equal to the length of one exposure 1a from the adjacent end of the sheet to provide a blank 2x at the corner of the printed sheet affording a convenient space for receiving a number or designation 2y such as "Film No. 327" (Fig. 2) applied by writing or stamping corresponding with the number stamped on the film container.

After the film 1 has been so wrapped around the sensitized sheet 2, the pictures are developed by rotating the cylinder with respect to an external source of light, thereby printing the negatives of the film upon the sheet, the printed pictures 2c as shown in Fig. 2 being disposed in rows parallel with the top and bottom of sheet 2, and the pictures 2c being arranged in a plurality of parallel rows, six such rows being shown each containing approximately six pictures 2c each. Where the film 1 crosses the line of abutment of the ends of sheet 2 on the cylinder 3, the developed picture will not be a complete unit unless the end of a negative 1a on the film happens to substantially coincide with the line of abutment of the ends of sheet 2. If it does not (as in the case of negative 6 (Fig. 3) one portion 6x (Fig. 2) of the said picture 2c on the sheet 2 will appear at the end of one row in the finished sheet, while the other portion 6y (Fig. 2) of the picture will appear at the opposite end of the next adjacent row of pictures, the portions 6x, 6y however mating. For the most part however the majority of pictures printed on sheet 2 will be complete. Since the negatives of the film are numbered as at 1b consecutively from "1" to "36", these same numbers will appear as at 2d in connection with the pictures 2c printed on the sheet, and thus after the sheet 2 has been printed and after the strip of rolled film 1 has been replaced in its container (usually a small box) the container and the sheet may be marked with corresponding numbers or designations, such as "Film No. 327" as indicated at 2y in connection with the sheet 2; and when it is desired to locate a particular negative 1a on a particular film, it is only necessary to locate the container of the film corresponding with the sheet number 2y, and by reference to the particular picture number 2d on said sheet the particular number 1b of the negative on the film may be readily ascertained. The sheet thus offers an excellent means for filing and indexing, as one need only refer to the flat sheets 2 which are in convenient size for storing or handling, and quick reference is available for locating a wanted negative without having to unroll various films and search blindly for the desired negative.

Our above outlined method moreover preserves the films since it saves needless handling, each unwinding operation tending to scratch the films. Moreover, the sheet 2 presents a ready view of all exposures on the film to ascertain which pictures 2c might warrant enlargement; also, by our method, since all of the prints are obtained on one exposure, the same printing exposure is used on all negatives, and thus one's photographic ability may be studied by reason of the fact that over- or under-exposure of various prints, disposed substantially side by side can be readily compared.

Figure 5:
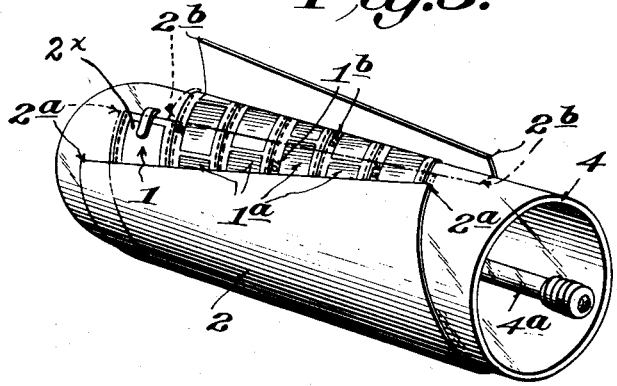
Fig. 5 is a diagrammatic view showing another method utilizing a cylinder and a light source disposed within the cylinder, and showing the positions of the sheet and film upon the cylinder.
Figure 6:
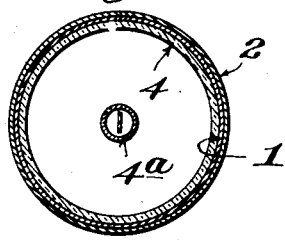
Fig. 6 is a transverse section through the wrapped cylinder indicated in Fig. 5.

In the modification shown in Figs. 5 and 6 a method is illustrated embodying the use of a transparent cylinder 4 having an internal light source indicated at 4a. In this method the film 1 is first wrapped in closely adjacent spirals around the exterior of cylinder 4 and secured thereto in any desired manner. The sensitive photographic paper sheet 2 is then wrapped around the cylinder with its sensitized surface innermost and covering the area of the spirally wrapped film, but preferably leaving the space 2a for receiving the number 2y of the sheet which corresponds with the film number as hereinbefore stated with respect to Figs. 3 and 4. The sides of sheet 2 should be parallel with and coincide with the ends of the spirally wrapped film, and the corners 2a, 2b of the sheet should be offset at the line of abutment, as indicated in dot and dash lines in Fig. 5, and as hereinbefore stated with respect to Figs. 3 and 4.

After the film 1 and paper 2 have been thus secured upon the cylinder 4, the cylinder is illuminated by the internal light source 4a, and all the negatives 1a on the film will be simultaneously printed as pictures 2c on the sheet 2 by one exposure, resulting in a sheet the same as shown in Fig. 2, in which each of the printed pictures 2c will bear numbers 2d corresponding with the numbers 1b on the film, and the sheet presenting a ready view of all exposures, offering a means of comparison of over- and under-exposures, and also offering a means for filing and indexing, and quick reference for wanted negatives, as hereinbefore mentioned.

Both methods above outlined enable one to print all the negatives from a long uncut strip of film onto a sensitized rectangular paper sheet of minimum size, without cutting the film.

Various kinds of apparatus may be employed in the practical utilization of our methods, and anyone familiar with the methods could readily devise an apparatus by which the invention could be utilized.

By reversing the process it would be possible to reproduce the strip from the printed sheet, by merely wrapping a sensitive strip spirally around the printed sheet.

We claim:

1. The method of printing from a strip series of negatives upon a sheet; consisting in bending a rectangular sheet into cylindrical form with the ends abutting and the corners at the line of abutment offset a distance substantially equal to the width of the strip; arranging the strip in closely adjacent spirals with respect to the sheet and parallel with the sides thereof, and then exposing the strip and sheet to light; whereby the series of negatives on the strip are reproduced in a plurality of rows of pictures parallel with the edges of the sheet.

2. In a method as set forth in claim 1, placing the sensitive sheet around a cylinder, and spirally winding the strip around the sheet on the cylinder, the strip and sheet being exposed to light exterior of the cylinder.

3. In a method as set forth in claim 1, spirally wrapping the strip around a translucent cylinder, placing the sensitive sheet around the spirally wound strip upon the cylinder, the strip and film being exposed to light applied through the cylinder walls.

PAUL R. PERKINS.
EDWIN CARTER PERKINS.